Sept. 6, 1955 J. R. ANDERSON 2,717,373

FERROELECTRIC STORAGE DEVICE AND CIRCUIT

Filed Dec. 14, 1951 3 Sheets-Sheet 1

INVENTOR
J. R. ANDERSON
BY
D. MacKenzie
AGENT

FERROELECTRIC STORAGE DEVICE AND CIRCUIT

Filed Dec. 14, 1951 3 Sheets-Sheet 2

INVENTOR
J. R. ANDERSON
BY
D. MacKenzie
AGENT

FERROELECTRIC STORAGE DEVICE AND CIRCUIT

Filed Dec. 14, 1951 3 Sheets-Sheet 3

INVENTOR
J. R. ANDERSON
BY
D. MacKenzie
AGENT

United States Patent Office 2,717,373

Patented Sept. 6, 1955

2,717,373

FERROELECTRIC STORAGE DEVICE AND CIRCUIT

John R. Anderson, Berkeley Heights, N. J., assignor to Bell Telephone Laboratories, Incorporated, New York, N. Y., a corporation of New York Application December 14, 1951, Serial No. 261,665

13 Claims. (Cl. 340—173)

This invention relates to an improvement in binary data storage systems, particularly such as utilize the ferroelectric property of certain substances, among them barium titanate being especially suited to this purpose.

The present invention is an improvement on that disclosed and claimed in my copending application Serial No. 254,245, filed November 1, 1951, "Ferroelectric Storage Device and Circuit," assigned to the same assignee as the present invention. That application described a data storage system making use of barium titanate as the ferroelectric element in memory cells, which might be wholly independent structures or use a common dielectric (barium titanate) provided with independent electrode pairs to constitute a plurality of memory cells electrically independent of each other.

The storage circuit now to be described differs in one way from previous ferroelectric circuits, including those described in my copending application above identified, in that a large number of individual memory cells may have one electrode in common and for each memory cell there are not required the separate diodes and condensers, as used in the earlier invention now improved on.

The present invention uses the ferroelectric material, under conditions providing a substantially rectangular hysteresis loop, in a two-dimensional binary storage system. A number of groups of binary digits may be stored in this system one group at a time. Any stored group of digits may then be read out of the system without disturbing other stored groups. The storing and reading out of groups of digits may be at either random or uniform time intervals. By employing an array of parallel line electrodes on opposite faces of a single ferroelectric crystal or sheet of ceramic as many as 2,500 binary digits may be stored in a space one inch square by a few mils thick.

One of the salient component requirements in the digital computer field is for improved types of data storage systems. Many storage systems such as magnetic drums, static magnetic delay lines, electrostatic storage tubes, and acoustic delay lines are presently being used in computers. However, none of these systems provide means for fast storage (in a microsecond or less) of large amounts of data in a relatively small space.

A general object of the invention is therefore to provide an improved ferroelectric data storage system.

Another general object is to provide improved circuits and apparatus for use in binary digital computers.

A specific object of the invention is to provide an improved data storage system in which memory cells are arranged in a two-dimensional array.

A feature of the invention is the use of a slab or wafer of a ferroelectric substance, specifically barium titanate as a preferred example, of which both faces are coated with parallel electrode strips, the strips on one face being laid at right angles to those on the other face. Viewed normally to the plane of the slab, each area thereof where the strips intersect (projectively) is seen to be a memory cell and almost any desired number of such may be formed on a wafer of small length and width.

A further object of the invention is therefore to provide a ferroelectric structure comprising a large number of memory elements in a region of small area.

The invention will be understood from the following description of a preferred embodiment thereof, read with reference to the accompanying drawings in which:

Fig. 1 exhibits the desired shape of ferroelectric hysteresis loop;

Figure 1:
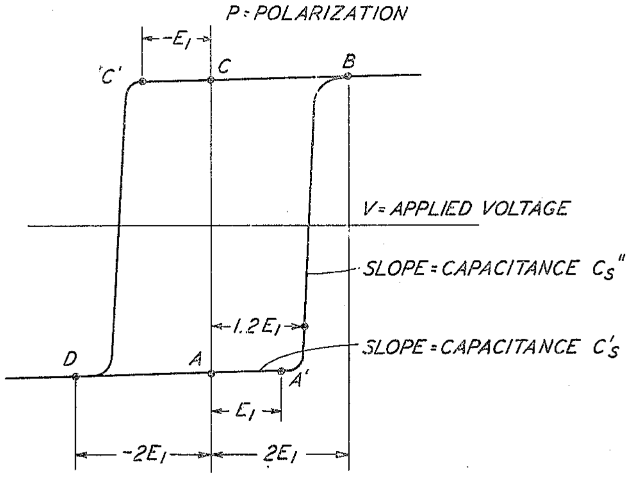
Figure 6:
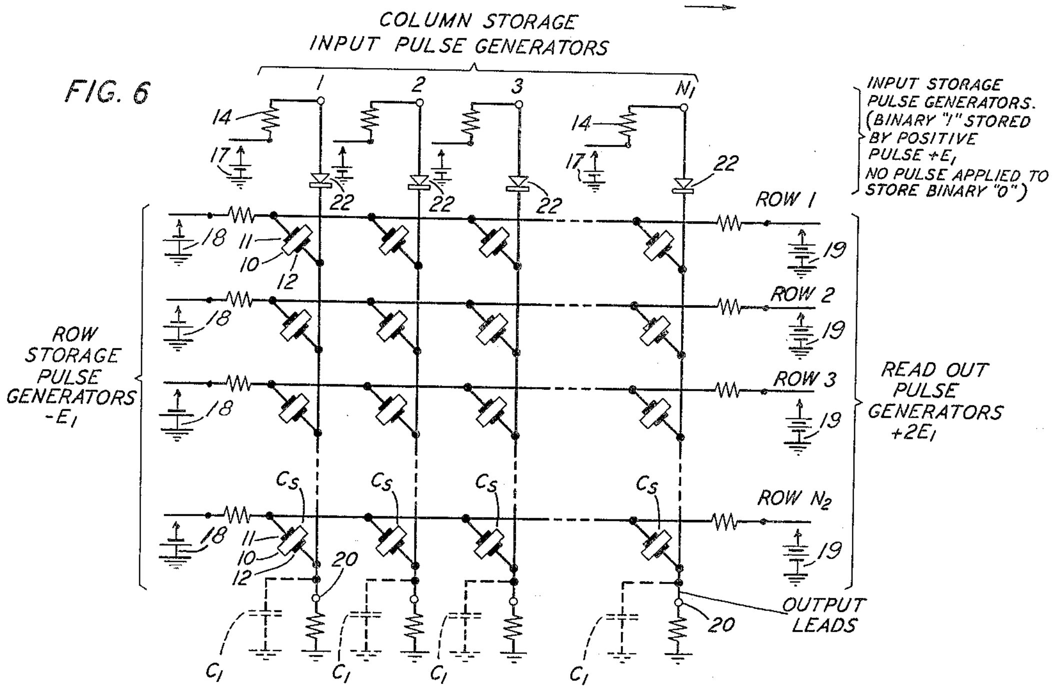
Figure 7:
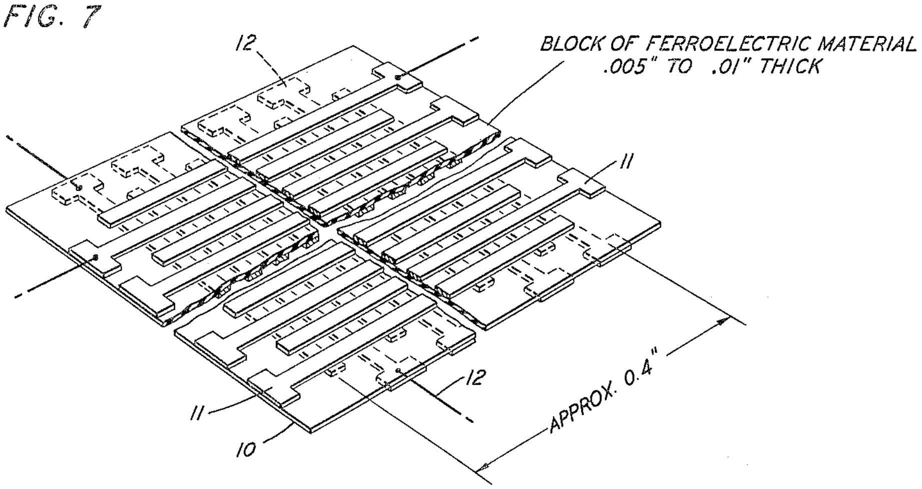
Figure 8:
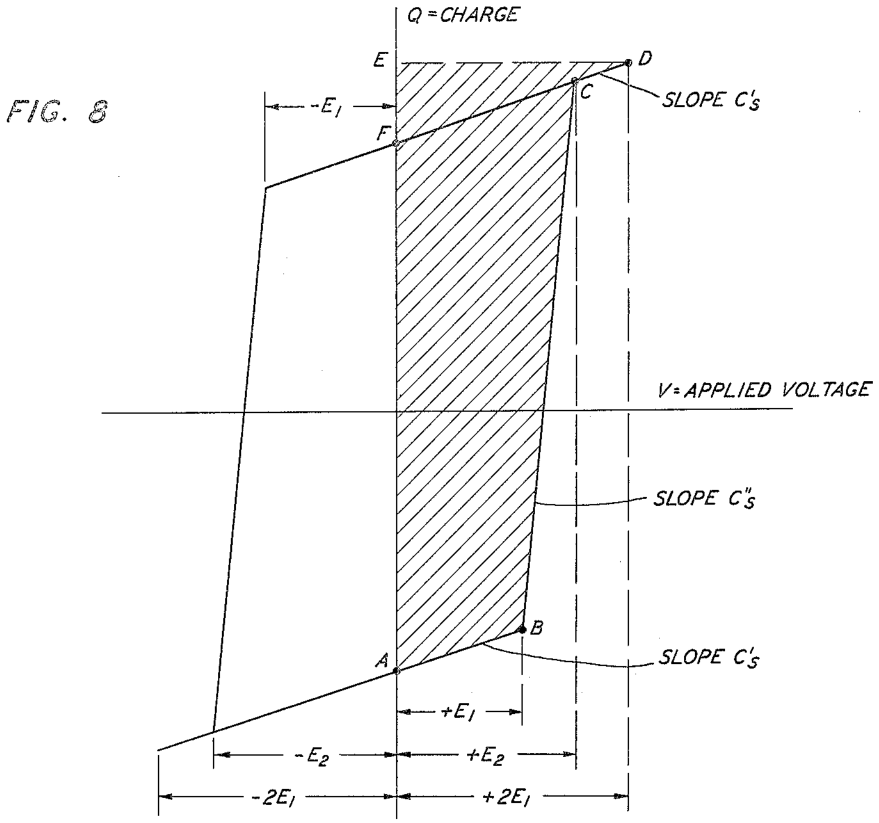

Fig. 6 schematically shows the connections of a two-dimensional array comprising $N_1$ columns and $N_2$ rows of ferroelectric memory cells;

Fig. 7 exhibits on a large scale the plan view of a two-dimensional array to be connected as in Fig. 6; and Fig. 8 is a diagram of a hysteresis loop, of the general type of Fig. 1, idealized for purposes of computation.

Referring now to the drawings, the type of ferroelectric hysteresis loop required for the two-dimensional storage system is shown in Fig. 1. It should be noted that the fundamental requirements of this material are that it be saturated by voltage pulses $\pm 2E_1$ volts but when the ferroelectric is in either state A or C, the application of voltage pulses $\pm E_1$ volts high will not change its final state. The capacitance of a single ferroelectric memory cell will thus always remain at a low value $C_s'$ when positive or negative voltage pulses $E_1$ volts high are applied. However, when positive or negative voltage pulses $2E_1$ volts are applied in a direction to reverse internal polarization, the state of the ferroelectric will pass from a low capacitance region $C_s'$ to a high capacitance $C_s''$ and then on to a low capacitance state $C_s'$ near saturation.

For reasons which will be shown below, the ratio of $C_s''$ to $C_s'$ should be of the order of 50 to 80 where a large number (60 to 100) of rows of memory cells are to be stored in a single slab of ferroelectric. To keep the power requirements low for storing and reading out information, it is desirable that the value of $E_1$ be as low as possible (5 to 10 volts) without requiring that the thickness of the ferroelectric be reduced below about 0.005 inch. For the same reason, the dielectric constant of the ferroelectric should also be as low as possible.

Other requirements for the ferroelectric material are that it can be obtained in thin slabs from one-fourth to four square inches in area and that small sections can be polarized independently of neighboring sections. It has been found that this latter requirement is met by barium titanate.

Figure 2:
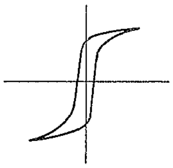
Fig. 2 shows the complete hysteresis loop of a specimen of barium titanate.

In Fig. 2 there is shown, derived from the trace on a cathode ray oscilloscope screen, the complete hysteresis loop of a specimen crystal of barium titanate. The voltage peak corresponding to saturation for this crystal was 475 volts. While the shape of the loop is not that desired according to Fig. 1, it is found that applying to the crystal a voltage wave of 17 volts peak produces a restricted loop substantially meeting the requirements stated in connection with Fig. 1.

Figure 3:
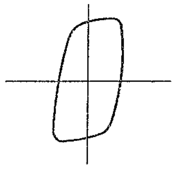
Fig. 3 shows on a larger scale a restricted hysteresis loop of the specimen providing the complete loop of Fig. 2.

Such a restricted loop is shown in Fig. 3 to a larger scale than the complete loop of Fig. 2. Both the complete and the restricted loop were obtained with a 60 cycle wave applied to the crystal.

Figure 4:
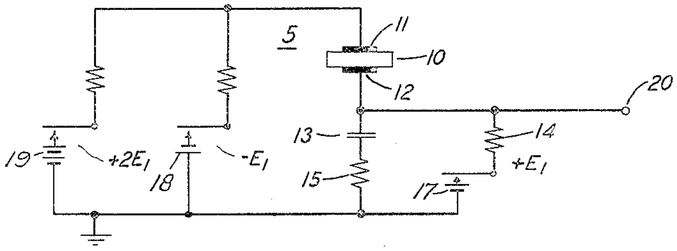
Fig. 4 is a diagram of the circuit for a single cell of a two-dimensional ferroelectric storage array.

In Figs. 4 and 6 are depicted schematically circuits employing condensers having dielectrics of a ferroelectric material with the characteristics just discussed. Fig. 6 depicts an array of such condensers, each condenser either comprising an individual unit or being a cross point of a multicondenser unit, as discussed further below with reference to Fig. 7; Fig. 4 depicts the circuit for just a single memory cell or condenser in the two-dimensional array of Fig. 6. However, Fig. 4 may also be considered as a circuit complete in and by itself and small be so described below.

In the circuit of Fig. 4, a binary "1" is stored in the condenser or cell 5 by simultaneously applying a storage pulse $+E_1$ volts high to one side of condenser 5 and a row storage pulse $-E_1$ volts high to the other side. When both of these pulses are applied the memory cell or condenser is negatively polarized to saturation and its state is shown by point D on Fig. 1. When these pulses are removed the state of the condenser dielectric returns to point A of Fig. 1. In this condition a binary "1" is stored in the memory cell or condenser.

If it is desired to store a binary "0," the memory condenser is left in its initial state at point C on Fig. 1, either by not applying any pulses to the condenser or by only applying the row storage pulse $-E_1$. If the latter occurs the state of the dielectric will travel from its initial point C on Fig. 1 to point C′ and then will return to point C upon removal of the pulse. Thus the memory cell remains positively polarized and has no information stored in it, which condition represents storage of a binary "0."

If only a storage pulse $+E_1$ volts is applied to the condenser, the state of the condenser dielectric will again change from C towards point B and then back to C again on Fig. 1 after removal of the pulse. Again since the polarization of the condenser dilectric has not changed no information is stored in it. Occasions when a storage pulse alone may be applied to a condenser for storage of a binary "0" will be further discussed with reference to the two-dimensional array of Fig. 6.

Information is read out of the condenser 5 by applying a positive pulse $+2E_1$ volts high across the cell in series with a condenser 13 shunted by a resistance 14, as shown in Fig. 4. If a binary "1" has been stored in the condenser 5, upon application of the positive read-out pulse the dielectric will traverse the portion of the hysteresis curve from point A to point B, which is a portion where the capacitance of the dielectric is high, and therefore a relatively large positive voltage pulse will appear on the output lead 20. If however, a binary "0" had been stored in the condenser 5, upon application of the positive read-out pulse the dielectric will traverse the portion of the hysteresis curve from C towards B, which is a portion where the capacitance of the dielectric is low, and therefore a much smaller or negligible positive pulse will appear on the output lead 20.

The condenser 5 in one specific embodiment comprises a barium titanate crystal 10 as the dielectric of the condenser and silver spots 11 and 12 on the upper and lower faces of the crystal, respectively. The dielectric may be 0.010 inch thick, while the electrodes (spots 11 and 12) are 0.020 inch in diameter. Electrode 12 is connected to condenser 13, in the circuit embodiment depicted in Fig. 1, which is in turn connected to ground and shunted by a resistance 14. The pulse $+E_1$, which is the column storage pulse for the storage of a binary "1," is applied from source 17 across condenser 13 and resistance 15; resistance 15 and the appellation of this pulse as a "column" storage pulse are described further below with reference to Fig. 6. The pulse $-E_1$ is the row storage pulse required from the storage of a binary "1"; it is derived from source 18 and is applied to electrode 11. The read-out pulse $+2E_1$ from source 19 is applied to electrode 11. The output pulse that appears at terminal 20 is of the same polarity as the read-out pulse, as discussed above. Of course reversal of all pulse polarities could be made without affecting the operation of the circuit.

In the specific embodiment depicted in Fig. 4 the output voltage pulse appearing on lead 20 during the read-out of the information stored in the condenser 5 is in fact the voltage appearing across the capacitor 13. If we consider that the ratio of the capacitances of the ferroelectric condenser 5 and the capacitor 13 during the read-out of a binary "1" is two-thirds, i. e., $C_s''$ is two-thirds the capacitance of capacitor 13, the voltage across the ferroelectric condenser 5 during the read-out will initially rise to $+1.2E_1$ if a binary "1" was priorly stored. This means that the output pulse will initially rise to $0.8E_1$ volts. During the time that the read-out pulse remains on, capacitor 13 will discharge and the ferroelectric condenser will charge up to the final voltage $+2E_1$ through the resistance 14. The state of the ferroelectric dielectric thus moves to point B and then to point C on Fig. 1.

The ratio of the capacitance $C''$ during this read-out process and the capacitance of the capacitor 13 has been chosen to make the voltage across the condenser 5 during the read-out pulse reach a point on the steep portion of the hysteresis loop. At the same time this choice of values will also prevent the voltage across capacitor 13 from ever reaching a value above $E_1$ volts during the read-out process. Similarly during the storage process the voltage across the capacitor 13 can never exceed $\pm E_1$ volts. Therefore in accordance with an aspect of this invention the capacitor 13 can actually comprise one or more other ferroelectric condensers in parallel. The initial state of these other condensers will never be changed by operation of the individual condenser depicted in Fig. 4 and their individual capacitance will always be equal to $C_s'$ during such operations on the individual condenser 5 in Fig. 4.

Turning now to Fig. 6 there is depicted another specific illustrative embodiment of this invention comprising a two-dimensional storage array in which the condenser 13 of Fig. 4 does in fact comprise the capacitances due to the other storage condensers; in such an embodiment the resistance 15 depicted in Fig. 4 is due to the parallel impedance of a number of pulse generators in other parts of the memory circuit and is assumed to be small enough to be neglected. The condensers are arranged in columns and rows, electrode 12 being connected in columns and electrode 11 in rows. Therefore the storage pulse $+E_1$ applied to any electrode 12 can be referred to as a column storage pulse and the storage pulse $-E_1$ applied to any electrode 11 can be referred to as a row storage pulse.

The storage array of Fig. 6 is capable of storing $N_2$ groups of $N_1$ binary digits. The $N_1$ digits in each group must be stored simultaneously on the input leads but the intervals between storage of groups may be random. The stored information is read out in groups of $N_1$ digits at a time in either random or uniform time intervals. The reading out process can take place between but not during the times of storage of other groups of information. The number $N_1$ of digits in a group is dependent only upon the number of cell spaces available in each row of the storage system. The number of rows $N_2$ in the storage system is dependent upon the cell spaces provided and the ratio of ferroelectric capacitances $C_s'$ and $C_s''$ as will be shown below.

With this arrangement information can be stored in any single memory cell of the array by applying $+E_1$ volts to the input lead for the column and $-E_1$ volts to the lead for the row in which the cell is located. The voltages across any other memory cell will never exceed $\pm E_1$ volts in magnitude except when information is being stored in that particular cell.

The columns in Fig. 6 are electrodes 12; the rows, electrodes 11. The application of the storage column pulses, 0 or $+E_1$, is made at the same time to all of electrodes 12. Now the application to electrodes 11 of row storage pulse $-E_1$, which stores the desired information in all of the cells in a given row, may be made in any desired sequence if more than one row is to be placed in that condition.

Digits "0" or "1" are thus fully stored in whatever rows have had the row storage pulse $-E_1$ applied.

When it is desired to read out the $N_1$ digits stored in a given row, a read out pulse $+2E_1$ is applied to all of the electrodes 11 in that row and at the corresponding outputs 20 there appear the output pulses indicative of the storage of either a binary "1" or "0" in the storage condensers having an electrode in that row.

The operation of the circuit of Fig. 6 may be set forth as follows:

If it is desired to store a binary "1" in any particular condenser a $+E_1$ voltage pulse is applied to the column lead of the condenser and simultaneously a $-E_1$ voltage pulse is applied to the row lead of that condenser. If it is desired to store a binary "0" in any particular condenser no voltage is applied to the column lead, though a voltage $-E_1$ may be applied to the row lead of the condenser.

If only a column storage pulse $+E_1$ is applied to a column lead, the dielectrics of all the condensers or cells in that column momentarily shift from their initial condition at point C, Fig. 1, to condition C′ and return to C when the pulse ceases; this is because applying a positive pulse between an electrode 12 and ground is effective in the same direction as the application of a negative pulse to the opposite electrode 11.

Let us now consider the storage of a group of $N_1$ digits in the condensers of a particular row, say row 1. Column storage pulses $+E_1$ will be applied to the column leads of certain of the condensers of this row and a row storage pulse $-E_1$ will be applied to all the condensers of the row. Those condensers having both storage voltages applied thereto will have their dielectric driven to point A, on Fig. 1, and thus will have a binary "1" stored therein; those condensers to which only the row storage pulse is applied will remain at point C, Fig. 1, and thus will have a binary "0" stored therein. Thus a group of $N_1$ digits is fully stored in row 1 and the condensers are now prepared for reading out, an operation which may be postponed practically as long as desired without loss or obscuring of the stored information.

The condensers in rows 2 through $N_2$ similarly may have stored in them either a binary "1" or "0" depending on the application or not of a column storage pulse $+E_1$ from the sources 17, it being assumed that row storage pulses $-E_1$ are always applied during the storage of information in any particular row. Thus $N_2$ groups of $N_1$ digits each are stored, each group occupying the memory condensers in its own row and the ferroelectric dielectric of each condenser being in the condition indicated by point A, Fig. 1, if a binary "1" was stored and in the condition indicated by a point "C" if a binary "0" was stored in it.

Obviously, during any interval between successive applications of group in put and row storage pulses, a stored group may be read out as a whole by applying a $+2E_1$ pulse from a source 19. But storage and reading out must not overlap in time.

When as many groups as desired have been stored in as many rows, the reading out of any row is independent of that of any other row, so that rows 1 to $N_2$ may be read out in any desired order. At the end of reading out, all the crystals to electrodes 11 of which a pulse $+2E_1$ has been applied are left in condition C when the read-out pulse ceases. The stored groups, stored in rows which may be arbitrarily chosen, appear in a like arbitrary sequence at outputs 20.

In the reading out of the information stored in the condensers in a particular row, a read-out voltage $+2E_1$ is applied to the condensers of that row and small or large positive voltage output pulses appear on the column output leads 20 of each condenser in that row depending on whether a binary "0" or "1" had been stored.

The storage and read-out sequence can be illustrated by reference to Fig. 5 which is a voltage-time plot of the voltage pulses applied to a single ferroelectric condenser in the array of Fig. 6 and the output pulses obtained when reading out a binary "1" or "0."

Figure 5:
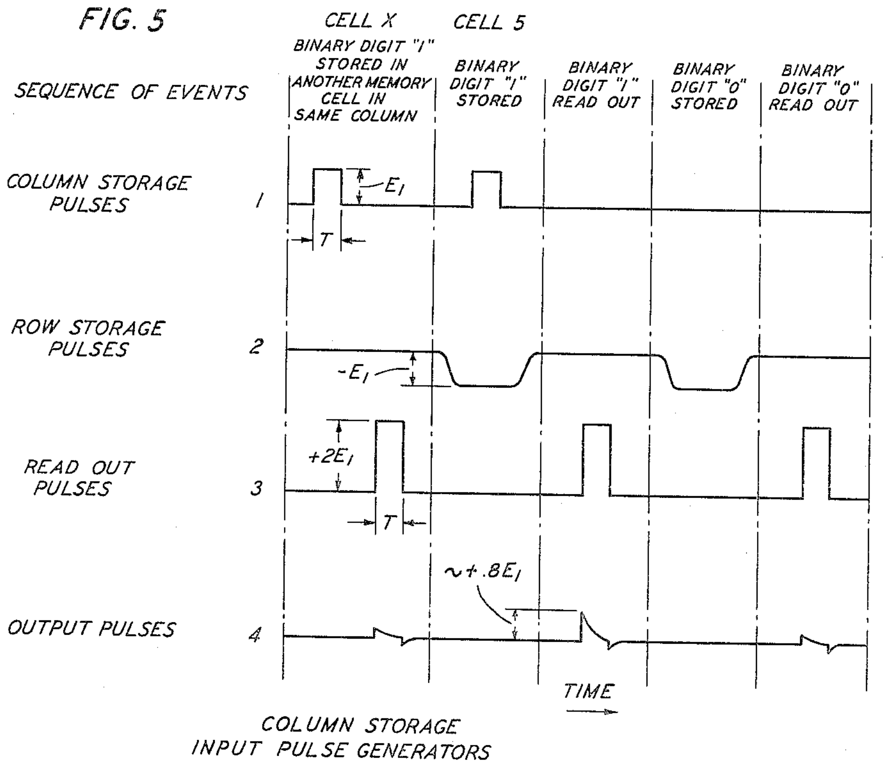
Fig. 5 is a diagram showing the series of pulses concerned in the operation of the circuit of Fig. 4.

For simplicity of illustration, there are contemplated in Fig. 5 a storage array having only two ferroelectric condensers or cells having a common dielectric; the two electrodes 12 on one side are electrically joined together and define a single "column," while the two electrodes 11 on the other side are electrically separate and define two "rows," of the type shown in Fig. 6. If digit "1" is to be stored and later read out from only one of the condensers, a column storage pulse $+E_1$ is applied to the two joined electrodes 12, and the row storage pulse $-E_1$ is applied to the electrode 11 of that condenser.

Line 1 of Fig. 5 shows the column storage pulses applied twice from a source 17, placing the common electrode at a voltage $+E_1$ volts above ground, for the storage of a binary "1" in first one and then the other condenser of this two condenser array. If a binary "0" is to be stored, no pulse $+E_1$ is applied, as indicated at the right of line 1 in the diagram.

Line 2 shows the negative row storage pulses from a source 18 applied to electrode 11 of only one of the two condensers or memory cells, thereby producing a polarization in that cell corresponding to the voltage $-2E_1$ if a binary "1" is to be stored, but having no effect on the other ferroelectric condenser or cell of this simplified array.

Line 3 illustrates the application of successive read-out pulses $+2E_1$ from source 19 to the electrode 11 of the one condenser or cell of this array. Thereupon, as indicated in line 4 of the diagram, a minute positive pulse appears on the output lead of that one ferroelectric condenser or cell if a binary digit "0" is stored in that cell and a much larger positive pulse appears on the output lead if a binary digit "1" had been stored in the cell; this large output pulse is produced by the discharge of condenser 13 when the read-out pulse reverses the polarization of crystal 10. In the diagram of Fig. 5 the one ferroelectric condenser to which these storage pulses are applied and whose output pulses are shown is referred to as cell 5 while the other ferroelectric condenser of this simplified two-condenser array is referred to as cell X and is, as indicated above and on the drawing, assumed to be in the same column as cell 5.

As in other types of ferroelectric memories, information may be stored for an indefinite time in the memory cell without any consumption of power. However, the stored information is destroyed by the reading out process.

In both Figs. 4 and 6, switches are shown which represent in greatly simplified form the operation of the cooperating circuity and are understood to operate such as to permit the various pulse applications.

A difference between the circuits of Figs. 4 and 6 is the insertion in the latter figure of diodes 22 individually in series with sources 17. The diodes are poled to present a low resistance to the positive column storage pulses, but their high resistance in the opposite direction isolates the individual sources 17 from other such. The insertion of diodes 22 avoids the need for adjusting the values of resistances 14 specially for each array. Such provision is unnecessary in the simple circuit of Fig. 4. When the diodes are added an external resistance is required between each output terminal 20, and ground.

Fig. 7 illustrates on a large scale the physical layout of 400 ferroelectric memory cells of which the common dielectric is about one-sixth of a square inch in area. Shown in full lines are the 20 electrodes 11 and in dotted lines the 20 electrodes 12, respectively above and below crystal 10. The crystal is preferably of barium titanate, about 5 or 10 mils thick. Electrodes 11 and 12 are suitably strips of silver paste, about 10 mils wide and spaced apart the same distance.

Any individual storage cell in Fig. 6 can be represented by the circuit of Fig. 4. The capacitance C of condenser 13, Fig. 4, then becomes the sum of all the capacitances $C_s'$ of other memory cells in the same column as the selected memory cell, plus any external shunt capacitance $C_1$. The equation for capacitance C of Fig. 4 then becomes:

$$C=(n-1)C_s'+C \quad (1)$$

where $n$ is the number of rows in the storage array; $C_s'$ is the low capacitance state of each ferroelectric cell; and $C_1$ is the external shunt capacitance on the output lead of the selected column of storage cells. If the relationship $C_s''=\frac{2}{3}C$ as shown in Fig. 4 is maintained, and $C_s''=xC_s'$ then from Equation 1 we may write $$C_s''=\frac{2}{3}\left[(n-1)\frac{C_s''}{x}+C_1\right] \quad (2)$$

For a given ratio of $C_s''$ to $C_s'$ as determined by the hysteresis loop of the ferroelectric material, the maximum number of rows $n$ of information which can be stored in a single ferroelectric arraw is reached when the external shunt capacitance $C_1$ is reduced to 0. Setting $C_1$ equal to zero in Equation 2 and solving for $n$ gives $$n=\frac{3x}{2}+1 \quad (3)$$

Thus from Equation 3 it can be calculated that a material having $x=100$ can store a maximum of 151 rows of memory cells while a material with an $x$ value of 50 can store 76 rows of memory cells. However, since allowances must be made for some external shunt capacitance $C_1$ in a practical storage array, the material having an $x$ ratio of 50 would probably be limited to about 60 rows of cells.

Each row of cells in the storage array is read out by applying a voltage pulse $+2E_1$ volts high with the read-out pulse generator connected to the common bus for that row. The voltage pulses will appear on the output leads of each memory cell in the row corresponding to the pulses shown in Fig. 5 for a single memory cell.

The polarities of all the pulse generators shown in Fig. 6 may be reversed if this is desirable for circuit reasons.

The energy required to store or read out information in the ferroelectric array described above is dependent upon the following factors:

1. The voltage ($2E_1$ of Fig. 4) required to drive the ferroelectric to saturation;
2. The dielectric constant in the low capacitance state;
3. The area of electrodes for a single memory cell;
4. The shape of the hysteresis loop of the ferroelectric material which includes the ratio of $C_s''$ to $C_s'$.

Assume that the hysteresis loop is a parallelogram having corners at voltage points $E_1$ and $E_2$ and straight lines extending from the $E_2$ points to $2E_1$ as shown in Fig. 8. In reading out or storing a binary "1" the ferroelectric material is driven to saturation by an applied voltage of $2E_1$ volts. The energy required to do this is represented by the cross-hatched area ABCDE in Fig. 8. When the voltage across the ferroelectric is removed some energy (that represented by the cross-hatched area above the line FD) will be released. The total energy consumed in charging the polarization of the ferroelectric is then represented by the area inside the right hand side of the hysteresis loop. However, the driving pulse generator must supply all the energy represented by area ABCDL as it cannot recover the small amount of energy released by the ferroelectric. By integration the energy of area ABCDL is found to be:

$$W=\frac{1}{2}C_s'[4E_1^2+(x-1)(E_2^2-E_1^2)] \quad (4)$$

where $C_s$ is the low capacitance state of the ferroelectric, and $x$ is the ratio between the high capacitance and low capacitance states of the ferroelectric.

Next, assume that the electrodes in the storage system are 0.005 inch wide so that an individual memory cell has an area of $25\times10^{-6}$ square inches. If the dielectric constant for the low capacitance state $C_s'$ is about 1000 and the ferroelectric thickness is 0.005 inch, $C_s'$ will be 1.128 micromicrofarads. Now assuming that $E_1=10$ volts, $E_2=1.4E_1$, and $x=100$, the power required to store or read out a binary "1" in $\frac{1}{10}$ of a microsecond is calculated to be .0581 watt. If a group of 100 binary digits "1's" are stored or read out in a $\frac{1}{10}$ microsecond interval, approximately 5.81 watts of power are required. For the constants assumed above the power required to read out a binary "0" in $\frac{1}{10}$ microsecond is only 0.00225 watt. If the time for storing or reading out information is increased to five microseconds (the time required for some storage tube systems) the total power required for storing 100 binary "1's" simultaneously will only be 0.116 watt.

The two dimensional ferroelectric binary data storage system described offers the following advantages:

1. Extremely compact size—about 2,500 bits of information could be stored in a ferroelectric slab one inch square by about 0.005 inch thick;
2. Simple mechanical structure;
3. Storage and read out with pulses less than a microsecond in length;
4. Low power consumption for storage and read out and no power consumption while information remains stored;
5. Information may remain stored for indefinite periods of time without regeneration;
6. Storage and reading out of information may be at random time intervals.

What is claimed is:

1. A ferroelectric data storage circuit comprising a ferroelectric element in series with a first resistance, a condenser and a second resistance in series and shunting the first resistance, means for applying across the first resistance a first voltage pulse of one polarity and of selected magnitude and simultaneously applying across the element and the first resistance a second voltage pulse of the selected magnitude and of the opposite polarity, and means for thereafter applying across the element and the first resistance a third voltage pulse of the one polarity and of twice the selected magnitude.

2. A ferroelectric data storage circuit comprising a condenser having a dielectric of a ferroelectric material in an initial state of polarization, means for applying first pulses of one polarity to one side of said condenser, means for applying second pulses of the opposite polarity to the other side of said condenser, said first and second pulses being individually insufficient to cause a reversal of the polarization of said material but when occurring together being sufficient to reverse the polarization of said material along one portion of the hysteresis loop of said material, and means for applying third pulses across said condenser of sufficient voltage to cause said material to return to its initial polarization along another portion of said loop.

3. A ferroelectric data storage circuit comprising a plurality of condensers comprising a dielectric of ferroelectric material in an initial state of polarization, means for applying first pulses of one polarity individually to one side of each of said condensers, means for applying second pulses of the opposite polarity to the opposite side of all of said condensers, said first and second pulses being individually insufficient to reverse the polarization of said material but when occurring together being of sufficient voltage to cause reversal of the polarization of the material of the condenser to which they are simultaneously applied, and means for applying third pulses across said condensers of sufficient voltage and proper polarity to cause said material to return to its initial polarization.

4. A ferroelectric data storage circuit comprising a plurality of condensers each comprising a dielectric of a ferroelectric material in an initial state of polarization, one side of each of said condensers being electrically connected together, means for applying first pulses of one polarity to said one side of each of said condensers, means for individually applying second pulses of opposite polarity to the opposite sides of said condensers, said first and second pulses being individually of insufficient voltage to reverse the polarization of said material but when occurring together being of proper polarity and sufficient voltage to cause reversal of the polarization of the material of the condenser across which they simultaneously appear, and means for applying third pulses across said condensers of sufficient voltage and proper polarity to cause a return to the initial state of polarization of any ferroelectric material whose polarization was reversed by the concomitant appearance thereat of said first and second pulses.

5. A ferroelectric data storage circuit comprising a plurality of condensers each comprising a dielectric of a ferroelectric material in an initial state of polarization, one side of certain of said condensers being electrically connected together and the other side of certain other of said condensers being electrically connected together, means for applying first pulses to said one sides, means for applying second pulses of opposite polarity to said other sides, said first and second pulses being individually of insufficient voltage to reverse the polarization of said material but being of sufficient voltage when applied concomitantly to a condenser to cause reversal of the polarization of the material thereof, and means for applying third pulses across said condensers of sufficient voltage and proper polarity to cause a return to the initial state of polarization of any ferroelectric material whose polarization was reversed by said concomitant application thereto of said first and second pulses.

6. A two-dimensional ferroelectric data storage circuit comprising a plurality of condensers each comprising a dielectric of a ferroelectric material in an initial state of polarization and arranged in parallel rows, first means electrically connecting together one side of each of said condensers in each row in one direction, second means electrically connecting together the other side of each of said condensers in each row perpendicular to said one direction, means for applying first pulses of one polarity to said first means, means for applying second pulses of the opposite polarity to said second means, said first and second pulses being individually of insufficient voltage to reverse the polarization of said material but when occurring concomitantly at any one condenser being of proper polarity and sufficient voltage to cause reversal of the polarization of the material of said condenser, and means for applying third pulses across said condensers of sufficient voltage and proper polarity to cause a return to the initial state of polarization of any ferroelectric material whose polarization was reversed by the concomitant appearance thereat of said first and second pulses.

7. A two-dimensional ferroelectric data storage circuit comprising a slab of a ferroelectric material, a plurality of spaced electrodes on each face of said slab constituted of parallel conducting strips, said strips on one face being at an angle to said strips on the other face whereby the ferroelectric material between intersecting electrodes on said faces comprise the dielectric of condensers formed thereby, means for applying first pulses of one polarity to said electrodes on said one face, means for applying second pulses of opposite polarity to said electrodes on said other face, said first and second pulses being individually of insufficient voltage to reverse the polarization of said material between intersecting electrodes but when applied concomitantly to intersecting electrodes being of proper polarity and sufficient voltage to cause reversal of the polarization of said material therebetween, and means for applying third pulses to all of said condensers thus defined of sufficient voltage and proper polarity to cause a return to the initial state of polarization of any portions of said slab whose polarization was reversed by the concomitant appearance of said first and second pulses.

8. A ferroelectric data storage circuit comprising a plurality of condensers each comprising a dielectric of a ferroelectric material in an initial state of polarization, means for applying first pulses of one polarity individually to one side of each of said condensers, means for applying second pulses of the opposite polarity to the opposite side of all of said condensers, said first and second pulses being each of a voltage magnitude approximately half sufficient to reverse the polarization of said material, and means for applying third pulses across said condensers of twice the magnitude of said first and second pulses and of a polarity to restore the initial state of polarization.

9. A ferroelectric data storage circuit comprising a plurality of condensers each comprising a dielectric of a ferroelectric material in an initial state of polarization, one side of certain of said condensers being electrically connected together and the other side of certain other of said condensers being electrically connected together, means for applying first pulses of voltage magnitude half sufficient to reverse the polarization of said material to said one side, means for applying second pulses of voltage magnitude half sufficient to reverse the polarization of said material and of opposite polarity to said first pulses to said other sides, and means for applying third pulses across said condensers of sufficient voltage and proper polarity to cause a return to the initial state of polarization of any ferroelectric material whose polarization has been reversed by the concomitant application thereto of said first and second pulses.

10. A two-dimensional ferroelectric data storage circuit comprising a slab of a ferroelectric material, a plurality of conducting strips on each face of said slab comprising spaced electrodes of a plurality of condensers defined between said conducting strips, means for applying first pulses of voltage magnitude half sufficient to reverse the polarization of said material to one of said strips on one face of said slab, means for applying second pulses of voltage magnitude half sufficient to reverse the polarization of said material and of opposite polarity to said first pulses to one of said strips on the other face of said slab, and means for applying third pulses to said two strips of sufficient voltage and proper polarity to cause a return to the initial state of polarization of any ferroelectric material whose polarization has been reversed by the concomitant application thereto of said first and second pulses.

11. A ferroelectric data storage circuit for the storing and reading out of a binary digit comprising a condenser having a dielectric of a ferroelectric material in an initial state of polarization, means for applying to one side of said condenser a first voltage of polarity such as to tend to reverse said state of polarization and of a magnitude representative of the digit to be stored, means for applying to the other side of said condenser a second voltage opposite in polarity to said first voltage and of magnitude half sufficient to reverse said state of polarization, and means for applying a third voltage across said condenser of such polarity and magnitude as to be capable of causing a return to the initial state of polarization of said material.

12. A ferroelectric data storage circuit for the storing and reading out of a binary digit comprising a condenser having a dielectric of a ferroelectric material in an initial state of polarization, means for applying to one side of said condenser a first voltage of such polarity as to tend to reverse the polarization of said material and of a magnitude half sufficient to reverse said polarization when digit "1" is to be stored, digit "0" being stored by the absence of said first voltage, means for applying a second voltage to the other side of said condenser of opposite polarity to said first voltage and half sufficient to reverse the polarization of said material, and means for applying a third voltage across said condenser of twice the magnitude of said first and second pulses and of a polarity to restore the initial state of polarization after a digit "1" has been stored on the concomitant application to said condenser of said first and second voltages.

13. A two-dimensional array of ferroelectric memory elements comprising a slab of ferroelectric material, a plurality of spaced electrodes on each face of the slab constituted of parallel conducting strips, the strips on one face running substantially at an angle to the strips on the other face, leads connected individually to the electrodes on each face, means for applying voltages of a chosen polarity to selected strips on the one face and simultaneously applying to selected strips on the other face second voltages opposite in polarity to the first voltages and means for subsequently applying to the selected strips on the other face third voltages of the same polarity as the first voltages and of magnitude substantially twice that of the second voltage.

References Cited in the file of this patent

UNITED STATES PATENTS

| | | |
|---|---|---|
| 2,120,099 | Iams | June 7, 1938 |
| 2,175,689 | Gallup | Oct. 10, 1939 |
| 2,540,194 | Ellett | Feb. 6, 1951 |

FOREIGN PATENTS

| | | |
|---|---|---|
| 750,556 | France | Aug. 12, 1933 |